US009524460B2

(12) United States Patent
Tsirline et al.

(10) Patent No.: US 9,524,460 B2
(45) Date of Patent: Dec. 20, 2016

(54) SYSTEM FOR PROCESSING MEDIA UNITS AND AN ASSOCIATED MEDIA ROLL

(75) Inventors: Boris Y. Tsirline, Glenview, IL (US); Karl Torchalski, Arlington Heights, IL (US); Martin Andreas Karl Schwan, Chicago, IL (US); Steven Kovanko, Downers Grove, IL (US); Anthony Brown, Spring Grove, IL (US); Chris Aiello, Franklin Park, IL (US); Daniel F. Donato, Johnsburg, IL (US); Robert Gawelczyk, Chicago, IL (US); Tom Zwier, Lake Zurich, IL (US); William Shuff, Glenviw, IL (US)

(73) Assignee: ZIH Corp., Lincolnshire, IL (US)

( * ) Notice: Subject to any disclaimer, the term of this patent is extended or adjusted under 35 U.S.C. 154(b) by 1731 days.

(21) Appl. No.: 11/755,600

(22) Filed: May 30, 2007

(65) Prior Publication Data
US 2008/0298822 A1 Dec. 4, 2008

(51) Int. Cl.
*G06K 19/077* (2006.01)
*B41J 3/50* (2006.01)
*B41J 15/02* (2006.01)
*B65H 18/28* (2006.01)

(52) U.S. Cl.
CPC ............ *G06K 19/07749* (2013.01); *B41J 3/50* (2013.01); *B41J 15/02* (2013.01); *B65H 18/28* (2013.01); *G06K 19/07718* (2013.01); *B65H 2557/13* (2013.01); *B65H 2701/52* (2013.01); *B65H 2801/12* (2013.01)

(58) Field of Classification Search
USPC ...................................................... 400/613
See application file for complete search history.

(56) References Cited

U.S. PATENT DOCUMENTS

| 2,812,501 A | 11/1957 | Sommers |
| 4,509,039 A | 4/1985 | Dowdle |
| 5,192,954 A | 3/1993 | Brockelsby et al. |
| 5,318,370 A | 6/1994 | Nehowig |

(Continued)

FOREIGN PATENT DOCUMENTS

| FR | 2 822 594 | 9/2002 |
| JP | 2004-362170 | 12/2004 |

OTHER PUBLICATIONS

International Search Report for corresponding International Application No. PCT/US2008/065035.

(Continued)

*Primary Examiner* — Jill Culler

(57) ABSTRACT

Media rolls, support structures for the media rolls, and media processing systems are provided. A media roll may include an identification transponder having retrievable information regarding the media units and associated media unit transponders wound around a core of the media roll. A support structure may include a spindle for supporting a media roll and include an identification coupler for communicating with the identification transponder. In addition to the spindle having the identification coupler, the media processing systems may include a second coupler for encoding the media unit transponders and a printhead for printing indicia onto the media units. The information retrieved from the identification transponder may be used to adjust one or more encoding and/or printing settings of the systems.

19 Claims, 16 Drawing Sheets

(56) References Cited

U.S. PATENT DOCUMENTS

| | | | |
|---|---|---|---|
| 5,587,578 A | 12/1996 | Serra | |
| 5,777,586 A | 7/1998 | Luxon et al. | |
| 5,838,253 A | 11/1998 | Wurz et al. | |
| 6,099,178 A * | 8/2000 | Spurr et al. | 400/207 |
| 6,104,291 A | 8/2000 | Beauvillier et al. | |
| 6,123,024 A * | 9/2000 | Williams et al. | 101/129 |
| 6,150,809 A | 11/2000 | Tiernan et al. | |
| 6,166,637 A * | 12/2000 | Cyr et al. | 340/572.1 |
| 6,227,643 B1 | 5/2001 | Purcell et al. | |
| 6,246,326 B1 | 6/2001 | Wiklof et al. | |
| 6,247,857 B1 | 6/2001 | Wheeler et al. | |
| 6,267,521 B1 | 7/2001 | Lodwig et al. | |
| 6,327,972 B2 * | 12/2001 | Heredia et al. | 101/35 |
| 6,392,544 B1 | 5/2002 | Collins et al. | |
| 6,409,401 B1 * | 6/2002 | Petteruti et al. | 400/88 |
| 6,425,663 B1 | 7/2002 | Eastlund et al. | |
| 6,512,594 B1 | 1/2003 | Lenz et al. | |
| 6,527,356 B1 | 3/2003 | Spurr et al. | |
| 6,565,188 B1 | 5/2003 | Saito | |
| 6,585,345 B2 | 7/2003 | Kosugi | |
| 6,593,853 B1 | 7/2003 | Barrett et al. | |
| 6,628,316 B1 | 9/2003 | Spurr et al. | |
| 6,634,814 B2 | 10/2003 | Spurr et al. | |
| 6,644,544 B1 | 11/2003 | Spurr et al. | |
| 6,793,301 B2 | 9/2004 | Kaburagi | |
| 6,802,659 B2 * | 10/2004 | Cremon et al. | 400/76 |
| 6,811,079 B1 | 11/2004 | Vraa et al. | |
| 6,832,866 B2 | 12/2004 | Klinefelter et al. | |
| 6,848,616 B2 | 2/2005 | Tsirline et al. | |
| 6,857,714 B2 | 2/2005 | Hohberger et al. | |
| 6,938,976 B2 | 9/2005 | Siwinski et al. | |
| 6,943,678 B2 * | 9/2005 | Muirhead | 340/505 |
| 6,967,579 B1 * | 11/2005 | Elizondo | 340/572.4 |
| 6,969,134 B2 | 11/2005 | Hohberger et al. | |
| 7,059,248 B2 | 6/2006 | Vaidyanathan et al. | |
| 7,077,489 B2 | 7/2006 | Waters | |
| 7,128,408 B2 | 10/2006 | Kosugi | |
| 7,133,055 B2 | 11/2006 | Vaidyanathan et al. | |
| 7,212,123 B2 | 5/2007 | Waters et al. | |
| 7,342,499 B2 | 3/2008 | Chiu et al. | |
| 7,398,054 B2 | 7/2008 | Tsirline et al. | |
| 2001/0024160 A1 | 9/2001 | Banach et al. | |
| 2002/0044164 A1 | 4/2002 | Kaburagi | |
| 2002/0101498 A1 | 8/2002 | Vuong et al. | |
| 2002/0191998 A1 | 12/2002 | Cremon et al. | |
| 2003/0023337 A1 * | 1/2003 | Godfrey et al. | 700/109 |
| 2003/0059050 A1 | 3/2003 | Hohberger et al. | |
| 2003/0062131 A1 | 4/2003 | Hohberger et al. | |
| 2003/0063001 A1 | 4/2003 | Hohberger et al. | |
| 2003/0063139 A1 | 4/2003 | Hohberger et al. | |
| 2003/0067504 A1 | 4/2003 | Spurr et al. | |
| 2003/0076520 A1 | 4/2003 | Haines et al. | |
| 2003/0160839 A1 | 8/2003 | Kosugi | |
| 2004/0002305 A1 * | 1/2004 | Byman-Kivivuori et al. | 455/41.2 |
| 2004/0061649 A1 | 4/2004 | Wielsma | |
| 2004/0102870 A1 * | 5/2004 | Andersen et al. | 340/572.8 |
| 2004/0178267 A1 | 9/2004 | Tsirline et al. | |
| 2004/0184801 A1 | 9/2004 | Vraa et al. | |
| 2005/0021172 A1 * | 1/2005 | Winter et al. | 700/228 |
| 2005/0024393 A1 | 2/2005 | Kondo et al. | |
| 2005/0025553 A1 | 2/2005 | Hohberger et al. | |
| 2005/0045723 A1 | 3/2005 | Tsirline et al. | |
| 2005/0045724 A1 * | 3/2005 | Tsirline et al. | 235/451 |
| 2005/0280537 A1 | 12/2005 | Feltz et al. | |
| 2006/0019135 A1 * | 1/2006 | Curello et al. | 429/22 |
| 2006/0066441 A1 | 3/2006 | Knadle, Jr. et al. | |
| 2006/0191022 A1 | 8/2006 | Hohberger et al. | |
| 2006/0221363 A1 | 10/2006 | Roth et al. | |
| 2006/0238600 A1 | 10/2006 | Vandermeulen et al. | |
| 2006/0255945 A1 | 11/2006 | Egbert | |
| 2007/0013520 A1 | 1/2007 | Conwell et al. | |
| 2007/0063843 A1 | 3/2007 | Tsirline et al. | |
| 2007/0099566 A1 | 5/2007 | Borisov et al. | |
| 2007/0147938 A1 | 6/2007 | Brown et al. | |

OTHER PUBLICATIONS

International Search Report from corresponding International Application No. PCT/US2008/064883.

Ron Schmitt; *Understanding electromagnetic fields and antenna radiation takes (almost) no math*; EDN; Mar. 2, 2000; pp. 77-88; available at <http://www.ednmag.com>.

David M. Pozar; Paragraph 2.5—*The Quarter-Wave Transformer*; Microwave Engineering; 2005; pp. 73-76; Third Edition; John Wiley & Sons, Inc.

Constantine A. Balanis; Chapter 2—*Fundamental Parameters of Antennas*: Paragraph 2.2.4—Field Regions; Antenna Theory: Analysis and Design; 2005; pp. 34-36; Third Edition; John Wiley & Sons, Inc.

Xianming Qing and Ning Yang; *2.45 GHZ Circularly Polarized RFID Reader Antenna*; IEEE; 2004; pp. 612-615 (XP10743394).

Boris Y. Tsirline; *UHF RFID Antennas for Printer-Encoders—Part 1: System Requirements*; High Frequency Electronics; Sep. 2007; pp. 28-39 (8 pgs); Summit Technical Media, LLC.

Boris Y. Tsirline; *UHF RFID Antennas for Printer-Encoders—Part 2: Antenna Types*; High Frequency Electronics; Oct. 2007; pp. 36-45 (8 pgs.); Summit Technical Media, LLC.

Boris Y. Tsirline; *UHF RFID Antennas for Printer-Encoders—Part 3: Mobile Equipment*; High Frequency Electronics; Nov. 2007; pp. 18-25 (5 pgs.); Summit Technical Media, LLC.

Office Action issued Aug. 31, 2011 in corresponding Chines Application 200880023482.5 (English Summary of Office Action attached).

\* cited by examiner

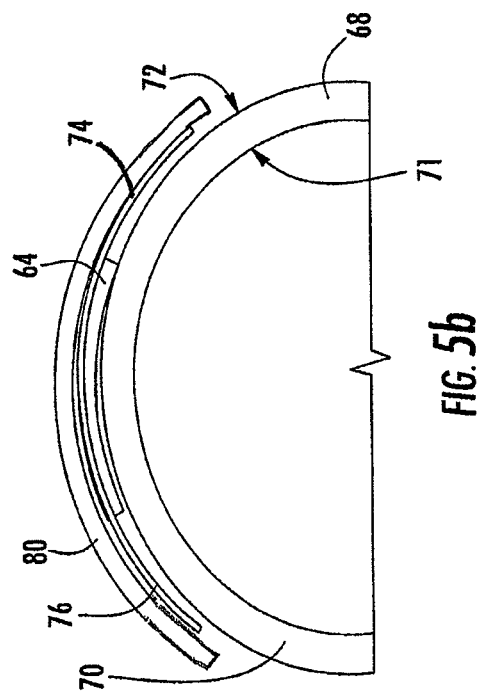
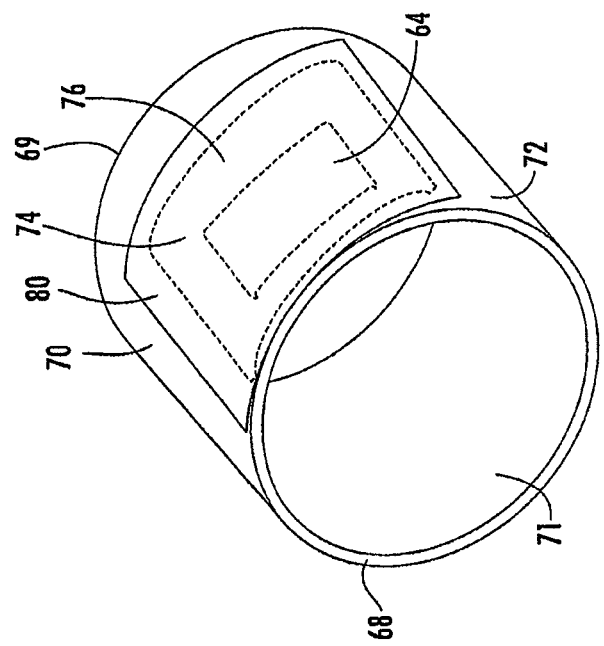
FIG. 5b
FIG. 5a

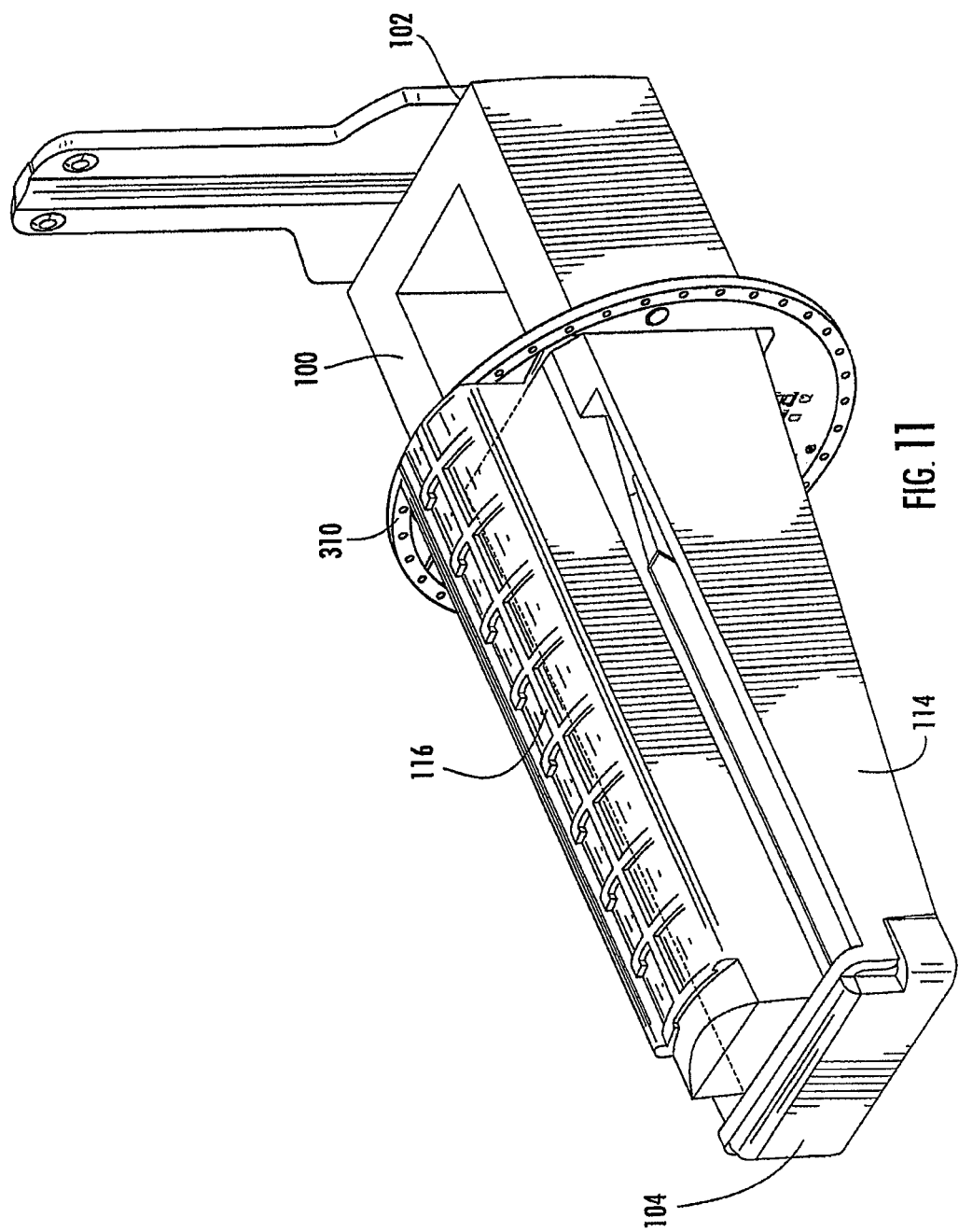

SYSTEM FOR PROCESSING MEDIA UNITS AND AN ASSOCIATED MEDIA ROLL

CROSS-REFERENCE TO RELATED APPLICATIONS

The present application relates to the application entitled "MEDIA PROCESSING SYSTEM AND ASSOCIATED SPINDLE" filed the same day as the present application and assigned to the same assignee as the present application.

BACKGROUND

Embodiments relate to media processing systems, such as printers, RF encoders and RF printer-encoders, and, more particularly, to devices and methods for authenticating or otherwise identifying a consumable within the media processing systems.

RF printer-encoders are devices capable of programming and printing a series or stream of smart media units. Smart media units are labels, tickets, cards, or other media forms carried on a liner or other web support with embedded or attached RFID tags or transponders. Many RF printer-encoders include a transceiver and coupler for encoding the transponders and a printhead for printing indicia onto the media units. A RF printer-encoder may be configured to receive a supply of media units. For example, a RF printer-encoder may have a spindle for receiving a roll of media units. A RF printer-encoder also includes a media conveyance means for moving the media units along a feed path from the supply of media units toward the encoding coupler and the printhead.

Media units, like other consumables of a RF printer-encoder, are intended to be used up and replaced. Because many RF printer-encoders may be configured to process various types and forms of media units, the new media units may differ from the media units that were replaced. In order to optimize the processing of the new media units, adjustments may have to be made in the print, encode, and other settings of the printer-encoder.

The adjustments may be made by an operator through a keypad or another operator input means of the printer-encoder. However it would be generally easier and faster if the printer-encoder could identify the new media units and make the adjustments automatically.

BRIEF SUMMARY

Embodiments relate to media rolls, support structures for the media rolls, and systems for processing a plurality of media units. The media roll may include an identification transponder having retrievable information regarding the media units and associated media unit transponders wound around a core of the media roll. The support structure may include a spindle for supporting the media roll and include an identification coupler for communicating with the identification transponder. In addition to the spindle having the identification coupler, the media processing systems may include a second coupler for encoding the media unit transponders and a printhead for printing indicia onto the media units. The information retrieved from the identification transponder may be used to adjust one or more encoding or printing settings of the processing systems or for counting purposes to estimate remaining or spent media units.

According to one embodiment, a media roll is provided. The media roll may include a core, a plurality of media units, an identification transponder, and a RF field insulator. The media units may be wound about the core and include one or more media unit transponders. The identification transponder may be attached to the core and have retrievable information or data pertaining to one or more of the plurality of media units. The RF field insulator may be positioned at least partially between the identification transponder and the plurality of media units such that the identification transponder is less susceptible to the influence of the one or more media unit transponders.

The identification transponder may be at least partially embedded into the core. Or the core may extend from a first end to a second end and include an outer surface and an inner surface and the identification transponder may be attached to either the inner surface or the outer surface of the core. Or in other embodiments, the identification transponder may be attached to an edge of the core.

The RF field insulator may be a ferrite patch that covers at least the identification transponder opposite the outer surface of the core or the ferrite patch may substantially cover the entire outer surface of the core. The media roll may further include a conductive foil extending around the core and the ferrite patch.

In some embodiments, the media unit transponders may be configured to operate within a first frequency band and the identification transponder may be configured to operate within a second frequency band that is different from the first frequency band.

In another embodiment a hanger or spindle for, supporting the media roll within a media processing system is provided. A hanger typically refers to a core support that is sized relative to the core so as to provide a low friction connection with the core, while a spindle typically refers to a core support that is sized so as to provide a snug fit with the core. However, these terms should be considered interchangeable when used herein and especially in the claims. As such, for the remainder of the description, the term spindle is used to refer to both a spindle or a hanger. The spindle may include a support member, a coupler, and a coupler housing member. The support member may extend from a first end and a second end and define at least a portion of a contact area between the spindle and the media roll. The coupler is adapted to link a transceiver of the media processing system with the identification transponder. The coupler may also define an opening for accepting at a portion of the support member. The coupler housing member may be configured to substantially surround the coupler.

A top surface area of the support member may define a contact area between the spindle and the media roll and a top area of the coupler housing member may be configured to mimic the contact area defined by the support member such that the top area of the coupler housing member effectively becomes an extension of the contact area. The coupler housing member may also include a cone-shaped loading edge to facilitate the loading of the media roll onto the spindle.

The coupler may be based on a resonant magnetic planar antenna configured to establish an edge magnetic coupling with the identification transponder. For example, the coupler may include one or more printed circuit boards having one or more coil traces responsive to a RF signal supplied by the transceiver of the media processing system. The coupler may also include one or more tuning and impedance matching components and one or more Faraday shielding rings for electrical field insulation.

In yet another embodiment a system for processing a plurality of media units is provided. The system may include a transceiver and a spindle. The spindle is configured to support a roll of media units, wherein the roll includes an identification transponder. The spindle may include a support member, a coupler, and a coupler housing member. The support member may extend from a first end and a second end and define at least a portion of a contact area between the spindle and the media roll. The coupler may be adapted to link the transceiver with the identification transponder. The coupler may also define an opening for accepting at a portion of the support member. And the coupler housing member may be configured to substantially surround the coupler.

The system may include a printhead for printing indicia onto the media units and a controller element adapted to adjust one or more printing settings of the system at least partially based on information retrieved from the identification transponder.

The system may include a second coupler and a second transceiver configured to encode one or more media unit transponders associated with the plurality of media units and the controller element may be adapted to adjust one or more encoding settings of the system at least partially based on information retrieved from the identification transponder.

According to another embodiment, the system includes a spindle, a first coupler adapted to link with the identification transponder, a second coupler adapted to link with the associated media units, wherein the second coupler is orthogonally oriented with the first coupler, and a first transceiver in communication with at least one of the first coupler and the second coupler. Each of the first and second couplers may be configured to operate within a first frequency band, such as ultra high frequency (UHF).

The system may include a second transceiver in communication with the second coupler while the first transceiver is in communication with the first coupler. The first coupler may include a microstrip band pass filter adapted to couple the first transceiver with a targeted media unit transponder in a transponder encoding region from among a group of multiple adjacent media unit transponders. As an example, the second coupler may include a cylindrical shaped conductive strip configured to fit within a core of the media roll. The system may further include a cylindrical support member for supporting the second coupler relative to the spindle.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5a is a perspective view of a core of a media roll according to an exemplary embodiment;

FIG. 5b is a partial side view of the core of FIG. 5a;

FIG. 9b is a rear view of the HF identification coupler of FIG. 9a;

FIG. 11 is a perspective view of a spindle with the HF identification coupler inserted and without an coupler housing member according to an exemplary embodiment;

DETAILED DESCRIPTION OF PREFERRED EMBODIMENTS

Aspects of the present invention now will be described more fully hereinafter with reference to the accompanying drawings, in which some, but not all embodiments of the invention is shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

The embodiments described herein have been depicted, for illustration purposes, in the context of a specific application, namely, RFID enabled printer systems, also referred to herein as "printer-encoders." Examples of printer-encoders are disclosed in commonly-owned U.S. Pat. Nos. 6,481,907; 6,848,616; and 7,137,000, which are hereby incorporated herein by reference. However, the inventive concepts described herein are not limited to printer-encoders and may be applied to other media processing systems (e.g., printers, encoders) that may, among other things, benefit from the ability to authenticate or otherwise identify a consumable.

Figure 1:
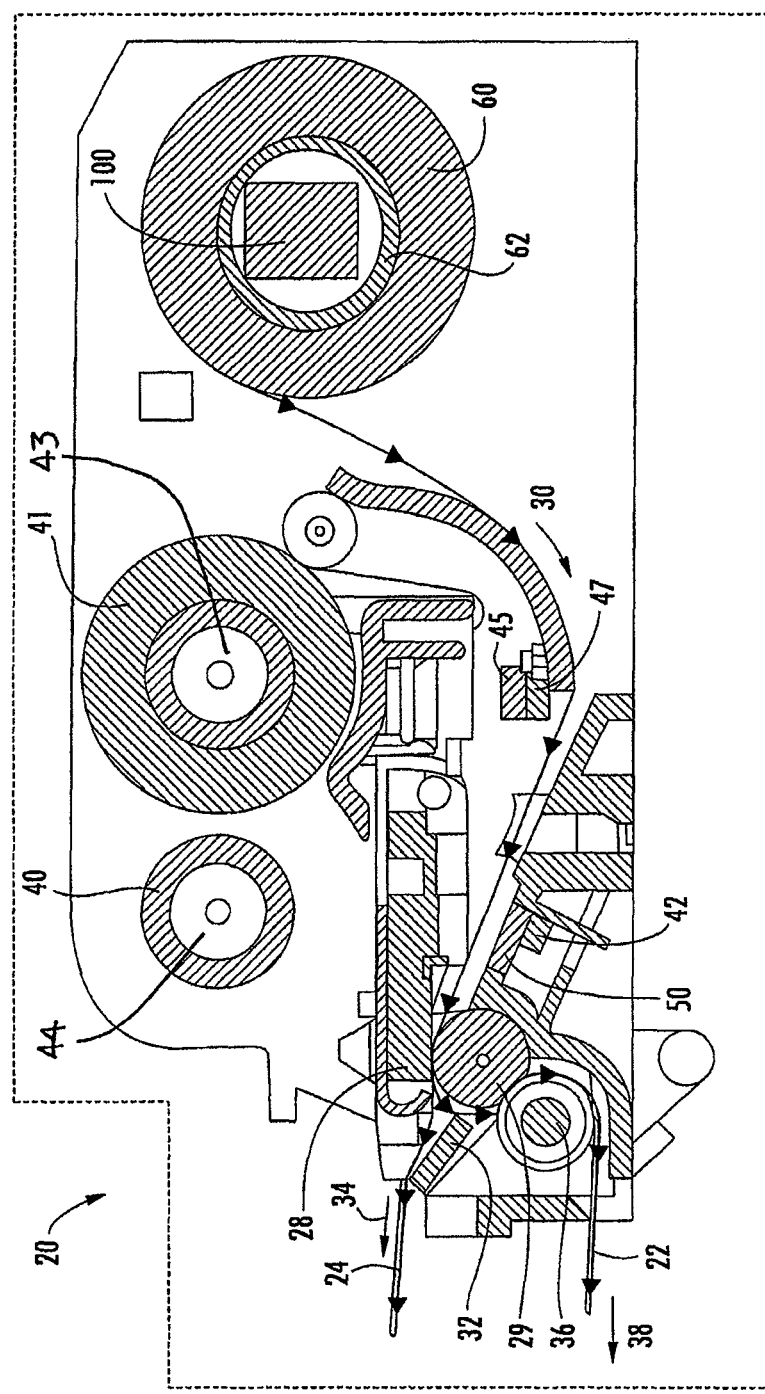
FIG. 1 is a side schematic view of a printer-encoder according to an exemplary embodiment.
Figure 2:
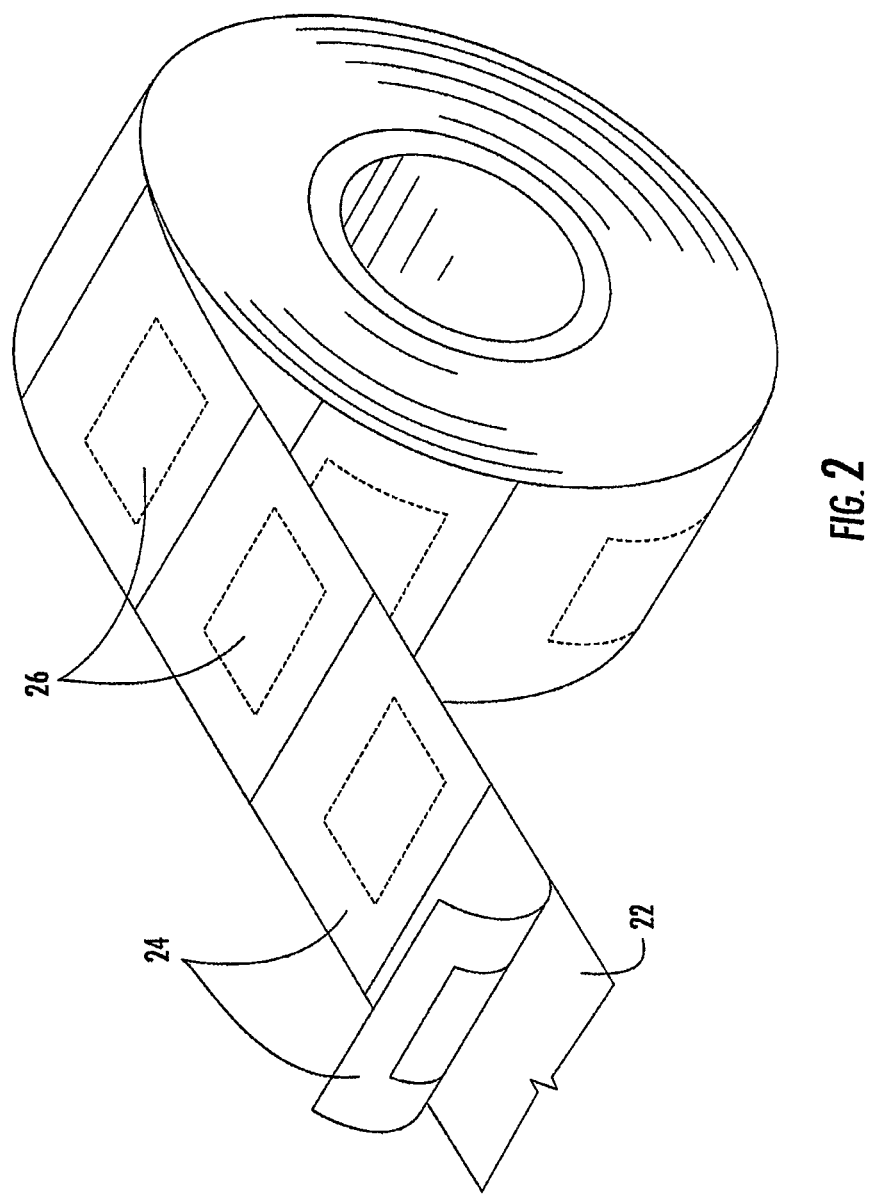
FIG. 2 is a perspective view of a media roll according to an exemplary embodiment.

FIG. 1 illustrates an RFID printer-encoder 20 structured for printing and programming a series or stream of media units (e.g., labels, tickets, tags, cards, and other media forms) according to an embodiment of the present invention. As illustrated in FIG. 2, at least a few of the media units 24 include transponders, referred to herein as media unit transponders 26. As noted above, media units may include labels, cards, etc, that are carried by a substrate liner or web 22 as shown in FIG. 2. Alternatively, a web may not be necessary.

Referring back to FIG. 1, the printer-encoder 20 includes several components, such as a printhead 28, a platen roller 29, a feed path 30, a peeler bar 32, a media exit path 34, rollers 36, a carrier exit path 38, a take-up spool 40, a ribbon supply roll 41, at least a first transceiver 42, a controller 45, at least one memory element 47, and at least a first coupler 50. The web 22 is directed along the feed path 30 and between the printhead 28 and the platen roller 29 for printing indicia onto the media units 24. The ribbon supply roll 41 provides a thermal ribbon (not shown for clarity) that extends along a path such that a portion of the ribbon is positioned between the printhead 28 and the media units 24. The printhead 28 heats up and presses a portion of the ribbon onto the media units 24 to print indicia. The take-up spool 40 is configured to receive and spool the used ribbon. The ribbon supply roll 41 and the take-up spool 40 may be supported by one or more spindles 43, 44 of the printer-encoder. This printing technique is commonly referred to as a thermal transfer printing. However, several other printing techniques may be used including, but not limited to, direct thermal printing, inkjet printing, dot matrix printing, and electro-photographic printing.

After printing, as shown in FIG. 1, the media unit web 22 proceeds to the media exit path 34 where the media units are typically individually removed from the web 22. For example, in one embodiment, pre-cut media units 24 may be simply peeled from the web 22 using the peeler bar 32 as shown. In other embodiments, a group of multiple media units may be peeled together and transmitted downstream to an in-line cutter for subsequent separation (not shown). Various other known media unit removal techniques may be used as will be apparent to one of ordinary skill in the art.

In applications, such as the embodiment depicted in FIG. 1, in which the media units 24 are supported by a web 22, the web 22 may be guided out of the printer-encoder 20 along the carrier exit path 38 by rollers 36 or other devices. Techniques and structures for conveying or guiding the web of media units along the entire feed path of the printer-encoder are well known in the art and, thus, such techniques and conveyance systems are not described in great detail.

In the embodiment depicted, the printer-encoder further includes a transceiver for reading and/or encoding transponders located in media units. The first transceiver 42 is configured for receiving, generating, and transmitting RF communication signals that are broadcast by the first coupler 50 located proximate the media feed path 30. The first coupler, also referred to as the encoding coupler 50, is configured to establish, at predetermined transceiver power levels from the first transceiver 42, a mutual coupling between the first transceiver 42 and a targeted media unit transponder that is located in the transponder encoding region. More specifically, as the media web 22 proceeds along the media feed path 30 through the transponder encoding region, data may be read from and written to transponders disposed on media units 24 carried by the web 22.

The encoding coupler 50 may be configured as a spatially selective coupler capable of selectively communicating with a targeted transponder from among a group of adjacent transponders. In general, a spatially selective coupler is adapted to have a limited range in order to minimize inadvertent communication (e.g., activation, reading, or writing) of additional transponders beyond the targeted transponder as further explained in U.S. Patent Application Publication Nos. 2005/0045732 and 2005/0045724 and U.S. application Ser. No. 11/371,785, each to Tsirline et al. and each is hereby incorporated by reference as examples of spatially selective couplers and as background to potential concerns and techniques when interrogating multiple adjacent transponders. In other embodiments, the printer-encoder may include other anti-collision management techniques, such as an RF-shielded housing or an anechoic chamber, instead of or in addition to employing a spatially selective coupler.

In general, the first transceiver 42 is a device configured to generate, process, and receive electrical communication signals. One in the art would appreciate that similar devices such as transmitters, receivers, or transceivers may be used within this invention. "Transceiver" as used in the present application and the appended claims refers to the devices noted above and to any device capable of generating, processing, transmitting, or receiving electrical and/or electromagnetic signals.

Figure 3:
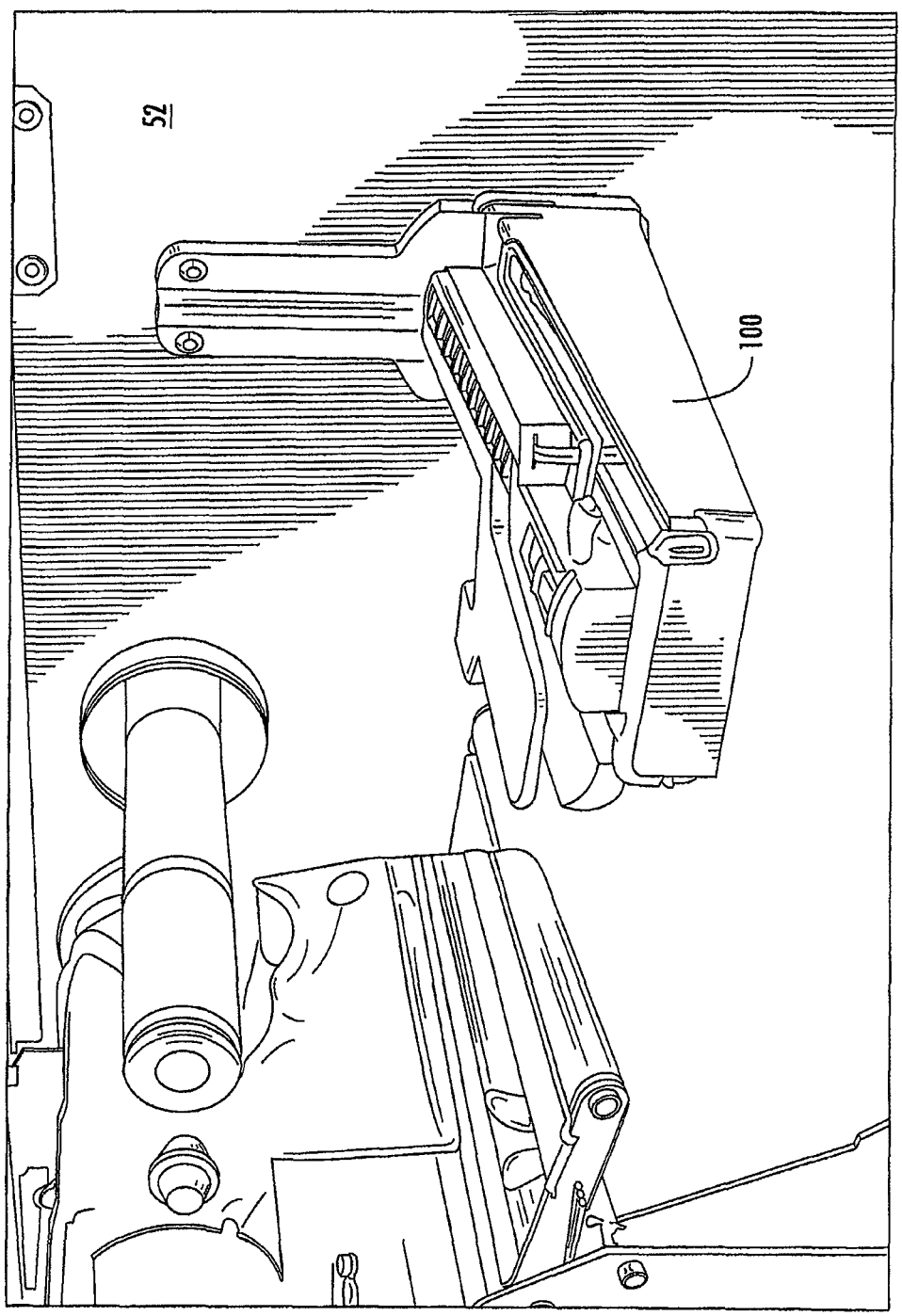
FIG. 3 is a perspective view of a spindle of the printer-encoder.
Figure 4:
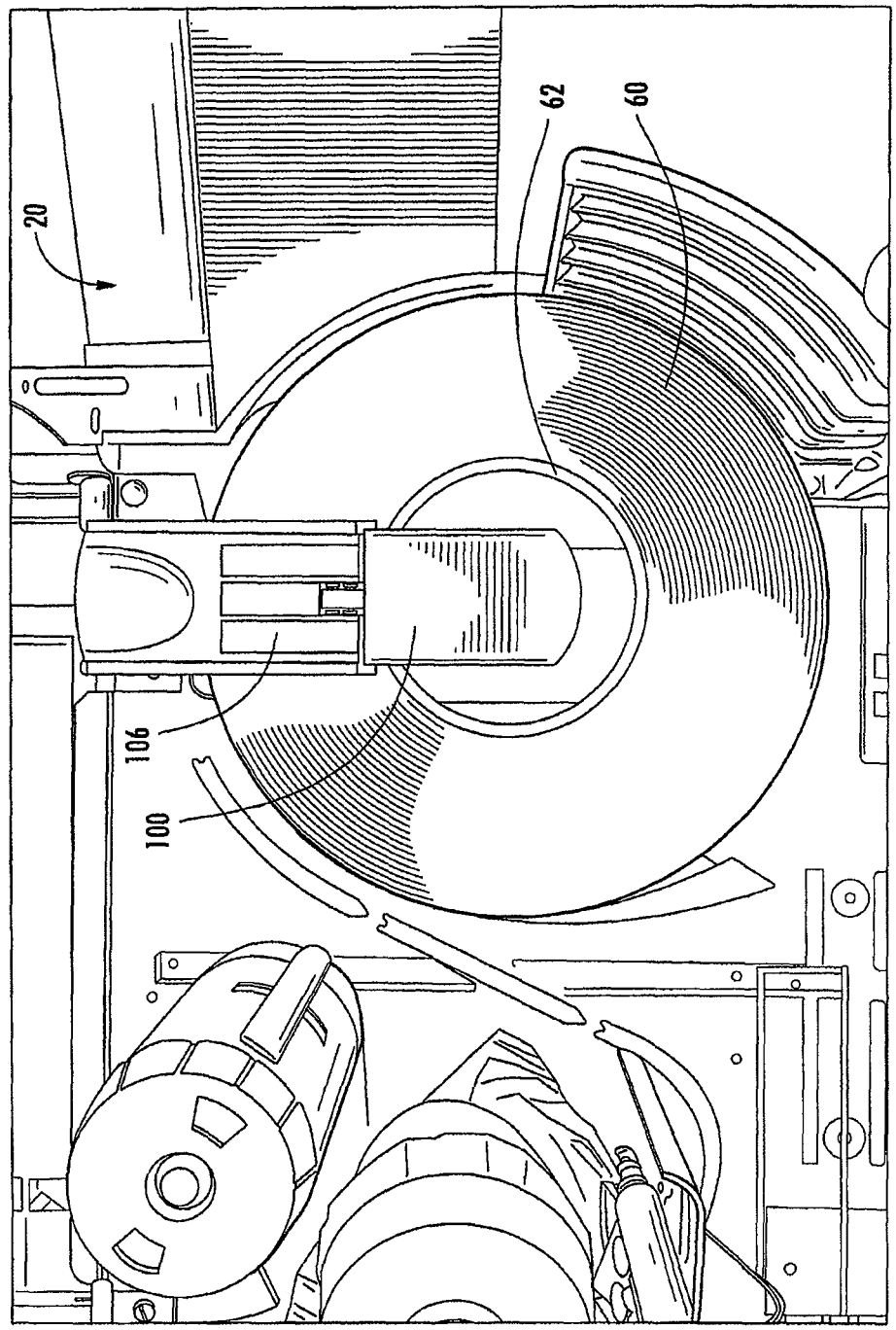
FIG. 4 is a side view of a spindle with a locking member and a media roll loaded onto the spindle according to an exemplary embodiment.

The printer-encoder 20 further includes a spindle 100 for supporting a roll 60 of the media units. The roll 60 includes a core 62 in which the media units are wound around in numerous layers. The core 62 is configured to fit around the spindle 100 as shown in FIGS. 1 and 4. The spindle 100 may be fixed with the core 62 rotating around the spindle 100 (i.e., hanger). Or the core 62 may be held to the spindle 100 with the spindle 100 and core 62 rotating together. As shown in FIG. 3, a first end of the spindle 100 may be mounted to a wall 52 or other structure within the printer-encoder 20. A second end of the spindle 100 may be a free end allowing for the insertion or removal of the core 62 from the spindle 100. Referring back to FIG. 4, the printer-encoder 20 may further include a locking member 106 configured to engage the second end of the spindle 100 to help secure the roll 60 of the media units to the spindle 100 (locking member not illustrated in FIGS. 1 and 3).

The construction of the core 62 may vary. However, as shown in FIGS. 5a and 5b, the core 62 may extend from a first end 68 to a second end 69 along a longitudinal axis and include a cylindrical wall 70 having an inner surface 71 and an outer surface 72.

The media roll 60 may also include at least one identification transponder 64. The identification transponder 64 may contain data or information pertaining to the roll 60 and more particularly regarding the media units 24 on the roll 60. For example, any or all of the following information may be stored within the identification transponder 64: the type of media units (e.g., dimensions and other physical properties of the media unit), the type of embedded media unit transponder (e.g., operational frequency, type of antenna, position relative to the rest of the media unit), read/write power levels to be used in reading and writing to the transponders, the number of media units, the manufacture of the media units and/or transponders, and a serial number or other unique identifier of the roll, communication protocol type, printing parameters (such as optimal darkness level for thermal printing), optimal media sensor parameters (such as emitter brightness, detector sensitivity, and detection threshold), a count of remaining or used media units, generic data or customer tables, an encryption scheme, types of compatible or recommended encoding couplers, encoding configuration settings, general printing and encoding formats, and quality or authentication features.

Another example of information that may be stored within the identification transponder 64 is an optimal retry level. In general, a trade-off exists between cost of wasted media units 24 and time or through-put. Not every media unit transponder 26 may successfully encode during a first attempt. In many cases, multiple attempts increase the likelihood of encoding one or all of the media unit transponders 26 that did not encode during the first attempt. The eventual successfully encoding of as many media unit transponders 26 as possible reduces the number of wasted media units 24. However, multiple attempts increase time needed for the encoding process and reduces the overall through-put of the printer-encoder 20. Also, some media unit transponders 26 may never encode due to damage or malfunction. In such cases, the prolonged retries may result in reduced through-put without a reduction in wasted media units 24. An optimal retry level is a number of retries or attempts that the printer-encoder should perform on a media unit transponder 26 that is not encoding before rejecting the media unit 24. The optimal retry level may vary depending on several factors such as transponder type, power levels, and transponder manufacturing process variations.

According to an exemplary embodiment, formatting or printing and encoding setting instructions may be stored or otherwise retrievable from the identification transponder 64. The instructions may include read and write power settings and optimal or acceptable printing techniques, e.g., direct thermal v. thermal transfer printing. The instructions retrievable from the identification transponder 64 may be complete or provide information to be used with additional information already stored within the printer-encoder 20. For example, the identification transponder 64 may include the complete print format and/or encoding instructions for the media unit transponders 26. As another example, the identification transponder 64 may include all or some of the instructions for the controller 45 of the printer-encoder that are necessary to determine the recommended or optimal print settings for the media units and encoding settings for the media unit transponders 26. As yet another example, a memory element 47 of the printer-encoder may store printing and encoding settings for various types of media units. The stored settings may be customized, i.e., an operator may have entered the settings through the input devices of the printer-encoder, and/or the stored settings may be a factory setting or provided through firmware/software updates or downloads. The controller 45 may be configured to identify the media units 24 from the information retrieved from the identification transponder 64 and determine or adjust the printing and encoding settings from the information stored within the memory element 47. Therefore, the information that is retrievable from the identification transponder 64 may facilitate an automatic setting feature for the printer-encoder, in which the printer-encoder 24 is configured to adjust the print and encoding settings automatically based on the media units 24 inserted or loaded into the printer-encoder 20 without requiring additional input from an operator. In another embodiment, the controller 45 may generate an input request or recommendation, i.e., a message to the operator, based on the information retrieved from the identification transponder 64 for an operator input. For example, based on the retrieved information, the controller may generate a message on an output display of the printer-encoder asking the operator to select one or more print and encoding settings.

The nature and amount of information stored or otherwise retrievable from the identification transponder 64 may vary depending on the memory capability of the identification transponder 64. The identification transponder 64 may be an active or a passive transponder. For example, the identification transponder 64 may be a 256 bit passive tag or even a passive tag with an expanded memory capability, including, but not limited to, 1 gigabit. In general, the identification transponder 64 may function as part of a file system of the printer-encoder 20. The size of the file that the identification transponder 64 contributes to the file system may vary depending on the memory capability of the identification transponder 64.

In addition to the information retrievable from the identification transponder 64 and/or stored within the printer-encoder 20, additional information may be retrievable by a second identification transponder associated with the printer ribbon supply roll. More specifically, as with the media roll 60, the printer ribbon supply roll 41 may also have at least one identification transponder that contains data or information pertaining to the printer ribbon supply roll 60. The information contained by the identification transponder of the printer ribbon supply roll may be retrievable by a coupler and a transceiver of the printer-encoder. The controller 45 may be configured to process the information retrieved from the identification transponder 64 of the media roll and the identification transponder of the print supply roll to determine an optimal or proper print setting.

The information retrievable from the identification transponder 64 may also help to reduce or prevent an improper combination of a particular media type with a print and/or encode application or accidental usage of RFID enabled media units (i.e., media units with embedded transponders) in non-RFID applications. For example, pharmaceutical labeling or "Underwriters Laboratory" labeling may require a specific printer ribbon and label face-stock combination. The controller may be configured to confirm the proper media type, i.e., face-stock, before allowing the media units to be used in such applications. As another example, the controller may be configured to generate an error message when RFID enabled media units are identified but the formatting instructions do not provide for an encoding operation. In such a case, the formatting instructions may have to be updated or RFID enabled media units may have been accidentally loaded for a non-RFID application. In general, if the controller detects an improper media type for a particular format, the controller may generate an error message that may be overridden by an operator to allow the printing and encoding operations to continue. In particular applications, such as the printing or encoding of potentially controlled or sensitive labels, the controller may be configured to lock out the printer-encoder until it receives an override password or other override control that is only available to particular operators or managers. The retrievable information may be used to further assist in set-up operations, or to prevent operators from making unauthorized printer adjustments. Examples of such parameters include but are not limited to: RFID number of retries (expensive tags may have high retries, inexpensive ones low number of retries); language setting; and print speed.

The information retrievable from the identification transponder 64 may be specifically formatted for the formatting setting of the printer-encoder 20. More specifically, a stored format setting, i.e., printing and encoding settings, of the printer-encoder may be in a form of a particular markup language, such as XML, that includes one or more fields to be either printed onto the media label in a specific location and manner and/or encoded into the media unit transponder. The identification transponder may contain information according to one or more fields that correspond to the fields of the printer-encoder to facilitate a data merge, also referred to as a mail merge. For example, the format setting of the printer-encoder may be configured to program an EPC (electronic product code) into a particular field, e.g., field number three on the media unit transponder. The identification transponder may be encoded with the EPC in its field number three such that the controller downloads the value of field number three from the identification transponder directly to the media unit transponder.

Figure 6:
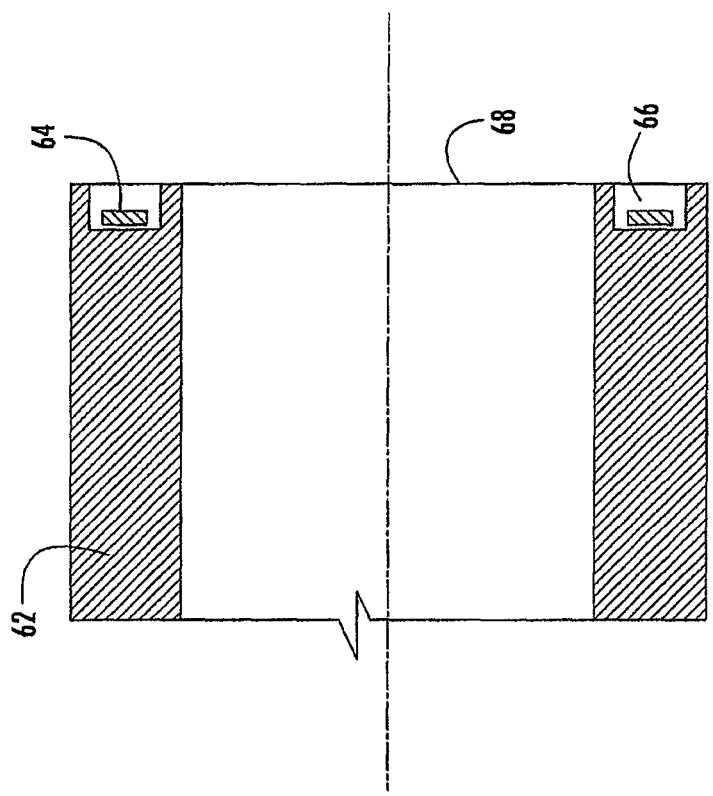
FIG. 6 is a partial cross-sectional view of a core according to an exemplary embodiment.

The identification transponder 64 may be embedded or otherwise attached to the core in various locations. For example, as shown in FIG. 6, the core 62 may include a groove 66 extending around an end 68 of the core. The groove 66 may be configured to receive a ring-shaped identification transponder 64. As other examples, the identification transponder 64 may extend along the inner surface 71, the outer surface 72 (such as in the embodiment depicted in FIGS. 5a and 5b), or embedded into the wall 70 of the core.

In order to retrieve the information from the identification transponder 64, the printer-encoder 20 may include at least a second coupler, referred to herein as the identification coupler, such as UHF identification coupler 210 discussed below. The identification coupler is configured to establish, at predetermined transceiver power levels, a mutual coupling between a transceiver of the printer-encoder 20 and the identification transponder 64. The transceiver may be the first transceiver 42 that is in communication with the encoding coupler 50 or a separate, second transceiver of the printer-encoder. The identification coupler and the identification transponder 64 may be operable in the same frequency band as the encoding coupler 50 and the media unit transponders 26 or in a different frequency band. For example, the identification coupler, identification transponder 64, the encoding coupler 50, and the media unit transponders 26 may each be configured to operate within UHF. Or as another example, the identification coupler 110 and the identification transponder 64 may be configured for HF while the encoding coupler 50 and the media unit transponders 26 may be configured for UHF. In still other embodiments, the identification coupler and the identification transponders 64 may be configured to operate in a first sub frequency band within UHF or HF and the encoding coupler 50 and the media unit transponders 26 may be configured to operate in a second sub frequency band within UHF or HF.

Figure 7:
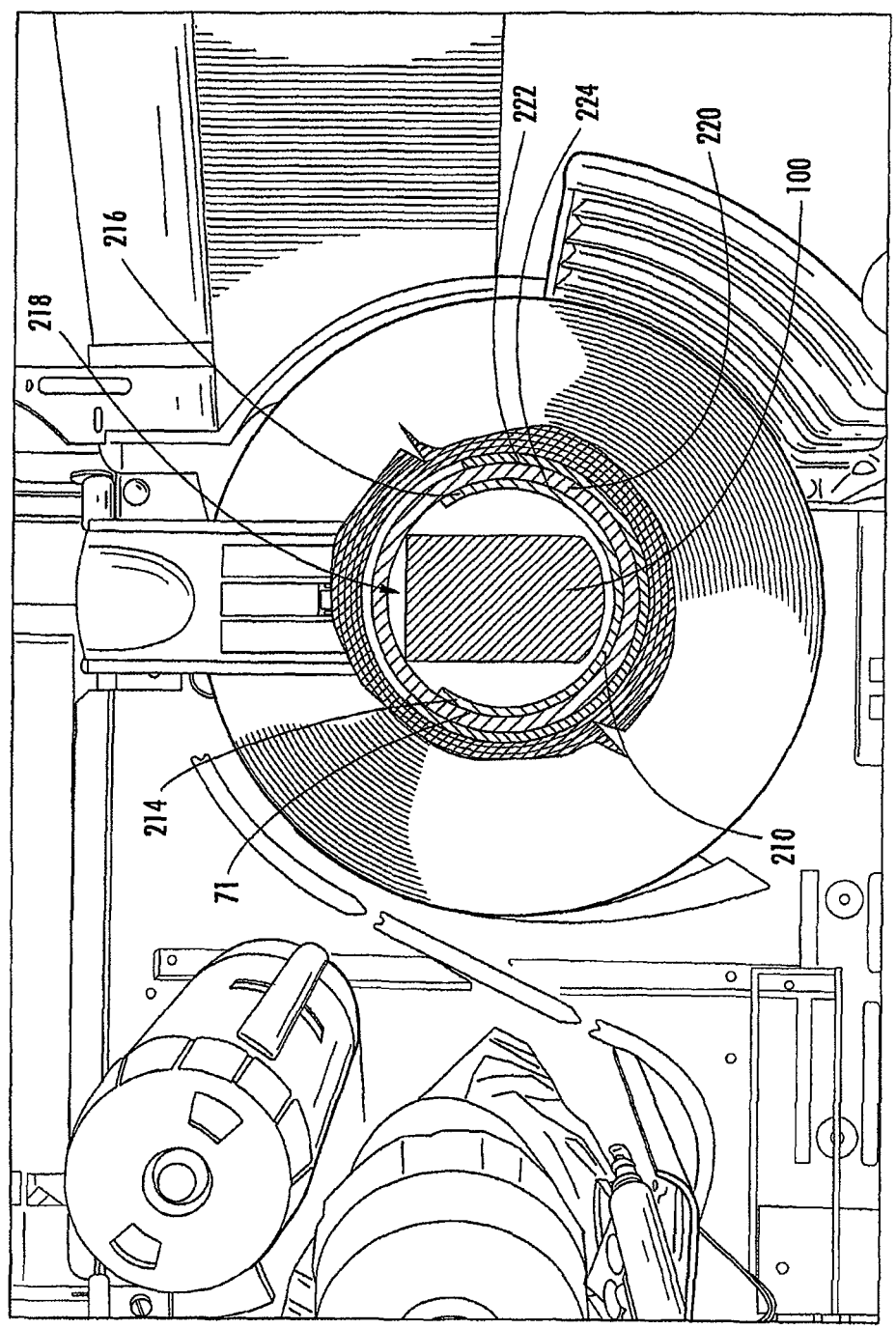
FIG. 7 is a partial cross-sectional view of the core and couplers of FIG. 4 taken along a mid-point of the media roll illustrating an identification coupler and an identification transponder according to an exemplary embodiment.
Figure 8:
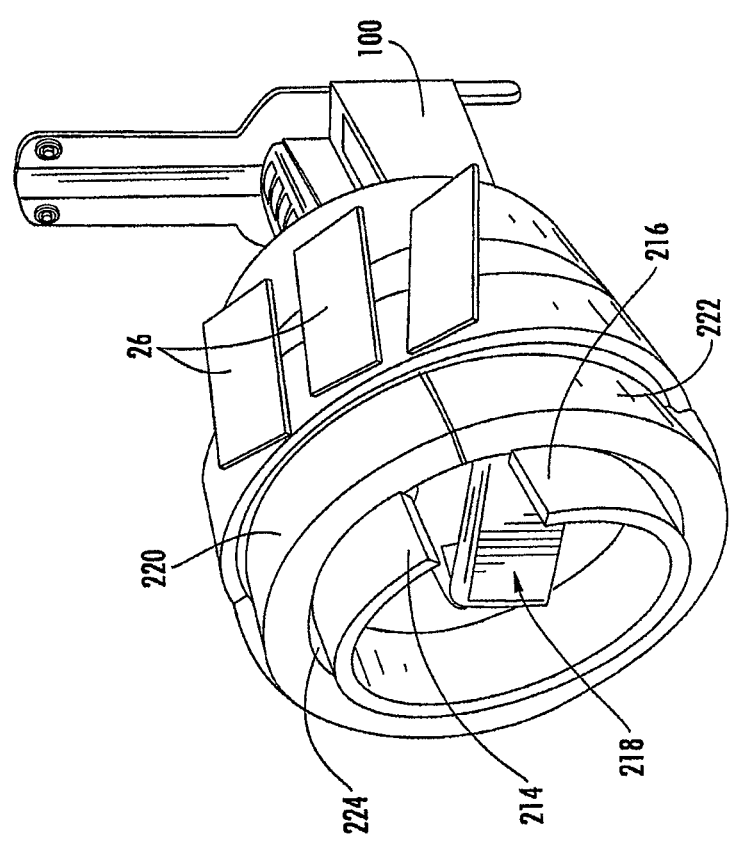
FIG. 8 is a perspective view of FIG. 4 with the identification coupler, identification transponder, and media unit transponders superimposed in order to illustrate the relative orientation of each component according to an exemplary embodiment.
Figure 10:
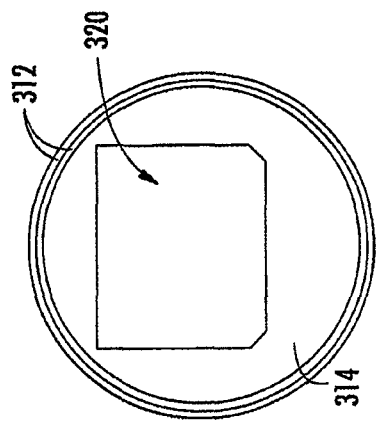
FIG. 10 is a front view of a PCB board of the HF identification coupler illustrating the coil traces according to an exemplary embodiment.
Figure 9B:
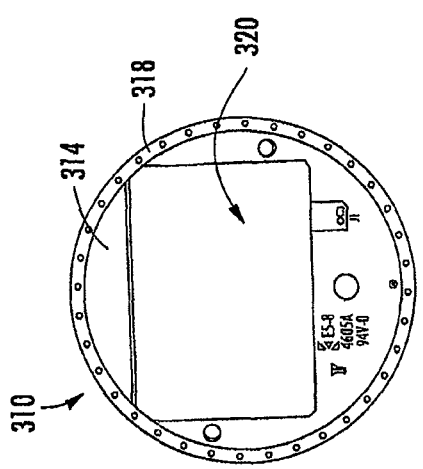
Figure 9A:
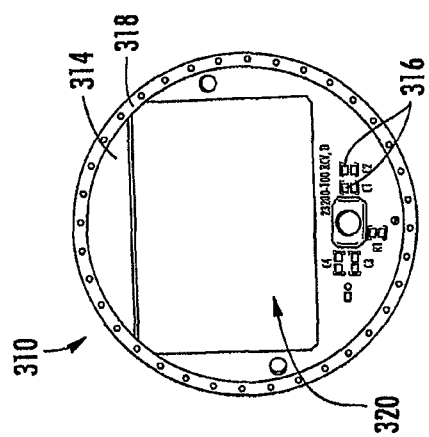
FIG. 9a is a front view of a HF identification coupler according to an exemplary embodiment.
Figure 12:
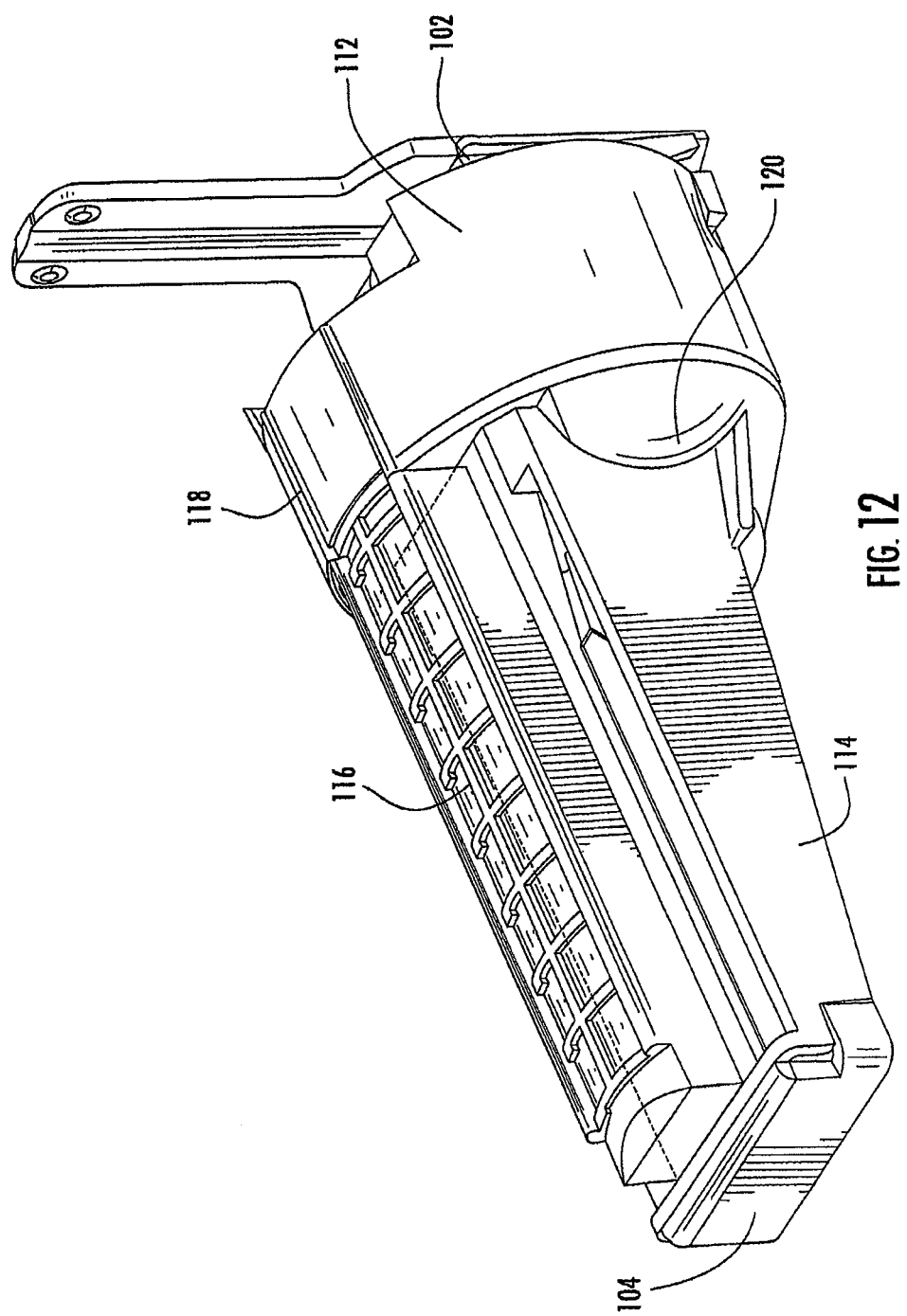
FIG. 12 is the perspective view of FIG. 11 with the coupler housing member.
Figure 13:
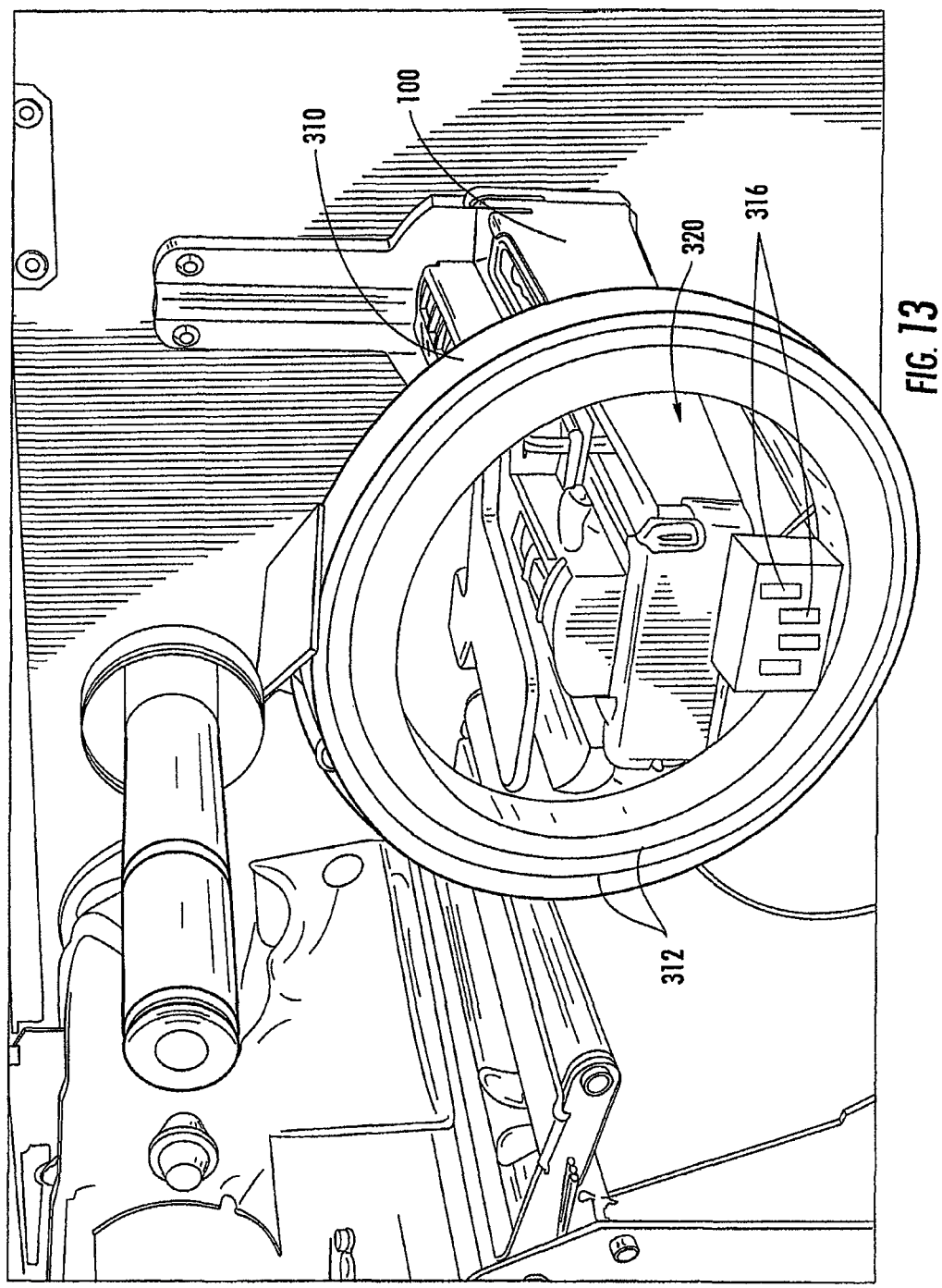
FIG. 13 is a perspective view of FIG. 4 with PCB based HF planar antenna and an identification transponder superimposed in order to illustrate the relative orientation of each component according to an exemplary embodiment.

According to an exemplary embodiment, the printer-encoder includes a UHF identification coupler in communication with the first transceiver. In particular, in this embodiment, the printer-encoder 20 has a first transceiver 42 in communication with a UHF spatially selective encoding coupler 50 and with a UHF identification coupler 210. To minimize inadvertent communication or other interference with the media unit transponders 26 on the roll 60, the UHF identification coupler 210 and the identification transponder 64 may be orthogonally oriented with the media unit transponders 26 as illustrated in FIGS. 7 and 8. The encoding coupler 50 may be based on a microstrip band pass filter. The encoding coupler 50 may be positioned close to the printhead 28 and have a "landscape" orientation (i.e., the encoding extends perpendicular to the label feed direction) for optimal coupling with a targeted media unit transponder 26. The encoding coupler 50 may also be perpendicular to the UHF identification coupler 210 which minimizes the likelihood of the encoding coupler 50 inadvertently or otherwise interfering with identification transponder 64.

The UHF identification coupler 210 may comprise a flexible microstrip transmission line. According to the embodiment illustrated in FIGS. 7 and 8, the UHF identification coupler 210 includes a cylindrical shaped conductive strip extending between a first end 214 and a second end 216. The first end 214 and second end 216 define an opening 218 between the two ends 214, 216. The depicted printer-encoder 20 further includes a support member configured to help hold the UHF identification transponder in sufficient proximity to the identification coupler. For example, the support member may be a cylindrical support member 220 having an outer surface 222 and an inner surface 224. The outer surface 222 of the cylindrical support member is configured to engage the inner surface 71 of the core and the inner surface 224 of the cylindrical support member is configured to support the UHF identification coupler 210. A portion of the inner surface 224 of the cylindrical support member 220 that corresponds to the opening 218 defined between the two ends 214, 216 of the conductive strip may engage the spindle 100 for supporting the cylindrical support member 220 and the UHF identification coupler 210 relative to the spindle 100. The cylindrical support member 220 may be constructed from a synthetic polymer, such as polytetrafluoroethylene (e.g., Telfon®) or other low permittivity materials.

Although the preceding embodiment includes the first transceiver in communication with both the encoding coupler and the identification coupler, in other embodiments the printer-encoder may include a second transceiver. In such an embodiment, the first transceiver communicates with the encoding coupler and the second transceiver communicates with the identification coupler. For example, according to an exemplary embodiment the identification coupler communicates with the second transceiver of the printer-encoder and the identification coupler may operate within the HF band and, thus, may be referred to as a HF identification coupler.

As a further example and as illustrated in FIGS. 9a through 13, a HF identification coupler 310 may be based on a resonant magnetic planar antenna configured to establish, at predetermined transceiver power levels, an edge magnetic coupling with the identification transponder 64. The HF identification coupler 310 may include one or more coils responsive to RF signals supplied by the second transceiver converting RF signals to an appropriate magnetic field. The coils may take the form of a planar elongated coils created, for example, by one or more conductors coupled with a coil support structure. The conductors and coil support structure may comprise, for example, one or more coil traces 312 on, within, or between one or more layers of a printed circuit board or boards (PCBs) 314. For example, the coupler may include two PCBs, each having a ground layer, a dielectric layer, and at least one coil trace. The two PCBs may be in parallel and adjacent one another with the coil traces facing each other. Each coil trace 312 may be formed without sharp corners to minimize creation of impedance discontinuities. The number of turns used in the coils is determined in part by the intended range from and longitudinal dimensions of the identification transponder 64 which is magnetically coupled to the coils. The HF identification coupler 310 may include one or more impedance matching and tuning components. For example, the HF identification coupler may include one or more capacitors 316, for example 4, for 50 ohms impedance match. And the HF identification coupler 310 may be tuned at 13.56 MHz. The HF identification coupler 310 may also include Faraday shielding rings 318 above the coil traces 312 for electrical field insulation.

The HF identification coupler 310 may be configured to engage the spindle 100. For example and as illustrated, the HF identification coupler 310 may define an opening 320 for accepting at least a portion of the spindle 100. With the HF identification coupler 310 positioned around at least a portion of the spindle 100 via the opening 320, the spindle 100 at least partially supports the HF identification coupler 310.

The spindle 100 may include a radome or coupler housing member 112 and a support member 114. In general, the support member 114 extends from the first end 102 to the second end 104 of the spindle 100 and defines a contact area 116, such as a top surface area, between the core 62 and the spindle 100. The support member 114 may be one integrated element or include one or more elements interconnected to form the support member 114. The coupler housing member 112 may be configured to help reduce environmental influences on the coupler 310 and to help provide a smooth surface for the loading of the media roll. As illustrated, the coupler housing member 112 may be generally cylindrical and configured to surround the coupler 310 near the first end 102 (i.e., the end attached to the wall 52 of the printer-encoder) of the spindle. A top area 118 of the coupler housing member 112 may be configured to mimic the contact area 116 of the support member such that the top area 118 effectively becomes an extension of the contact area 116 defined by the support member. The coupler housing member 112 may include a sloped or cone-shaped loading edge 120 extending toward the second end 104 of the spindle to help with the loading of the media roll. The inner surface of the cone-shaped loading edge 120 may also provide a mounting surface for the coupler 310 within the coupler housing member 112.

As explained above, the construction of the media roll 60 may vary. For example, in the embodiment illustrated in FIGS. 5a and 5b, the media roll 60 may include a core 62, an identification label 74, and a RF field insulator 80. The core 62 provides the general support to the rolled media units 24 and includes an inner surface 71 engageable with the spindle 100 and an outer surface 72. The identification label 74 includes a substrate 76, such as a sticker label, and a HF identification transponder 64, which may be embedded within or otherwise attached to the substrate 76. In this example, the sticker label may be used to attach the HF identification transponder 64 to the outer surface 70 of the core. The RF field insulator 80 is configured to make the HF identification transponder 64 less susceptible to interference from the media unit transponders wound above it also referred to as a winding effect. For example, the RF field insulator 80 may be a ferrite patch, a metal foil, or both extending over the HF identification transponder 64. The RF field insulator 80 may cover a limited area of the outer surface 70 that corresponds to the HF identification transponder 64 or the entire outer surface 70 of the core.

Figure 14A:
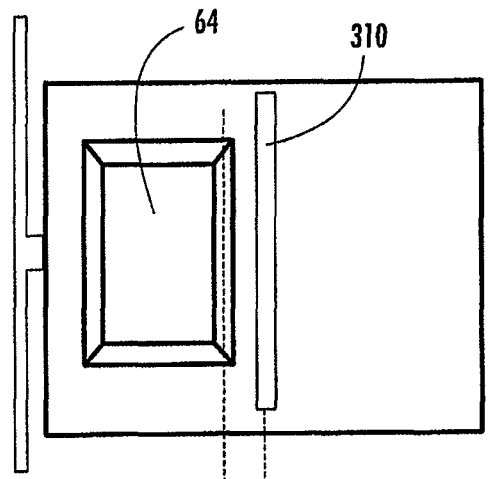
FIG. 14a is top view of an identification transponder being at a minimum offset position relative to an identification coupler according to an exemplary embodiment.
Figure 14B:
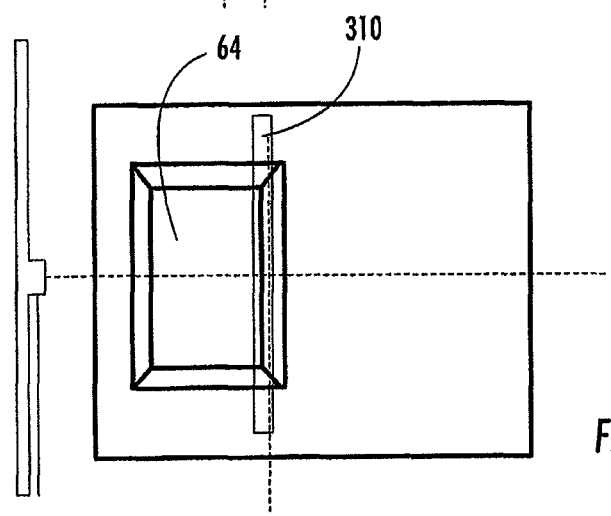
FIG. 14b is a top view of an identification transponder being at a middle offset position relative to an identification coupler according to an exemplary embodiment.
Figure 14C:
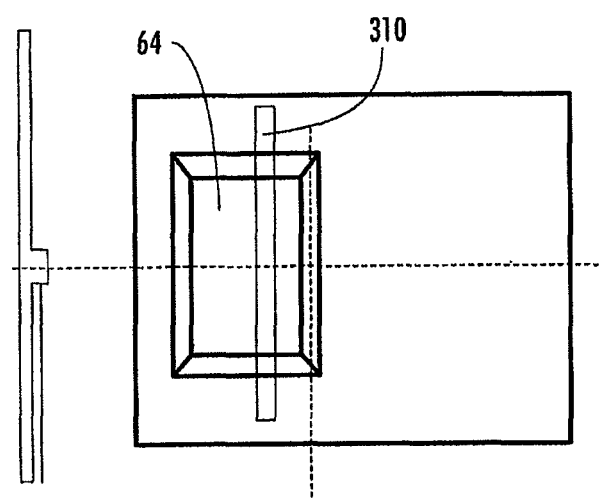
FIG. 14c is a top view of an identification transponder being at a maximum offset position relative to an identification coupler according to an exemplary embodiment.

The HF identification coupler 310 may be configured to couple with the transponder 64 through a core positioning range. In particular, as illustrated in FIGS. 14a through 14c, an identification transponder placement on the core 62 is defined by a distance to the coupler's plane to a maximize core positioning range. As illustrated in FIG. 14a, when a core offset is approximately 0 mm, the transponder location corresponds to a beginning of the core positioning range and the beginning of a range of coupling, above a minimum level, between the coupler 310 and the identification transponder 64. As illustrated in FIG. 14b, in the middle of the core position range a transponder-coupler alignment relates to a maximum coupling between the coupler 310 and the transponder 64. As illustrated in FIG. 14c, a transponder-coupler alignment at a maximum core positioning range relates to the end of the range of transponder-coupler coupling above a minimum coupling value. The transponder-coupler alignment may vary due to variations in dimensions between different media rolls and/or due to variations between the loadings of the different media rolls, i.e., a media roll may be loaded onto the spindle rolls at different distances from the first end of the spindle.

Figure 15:
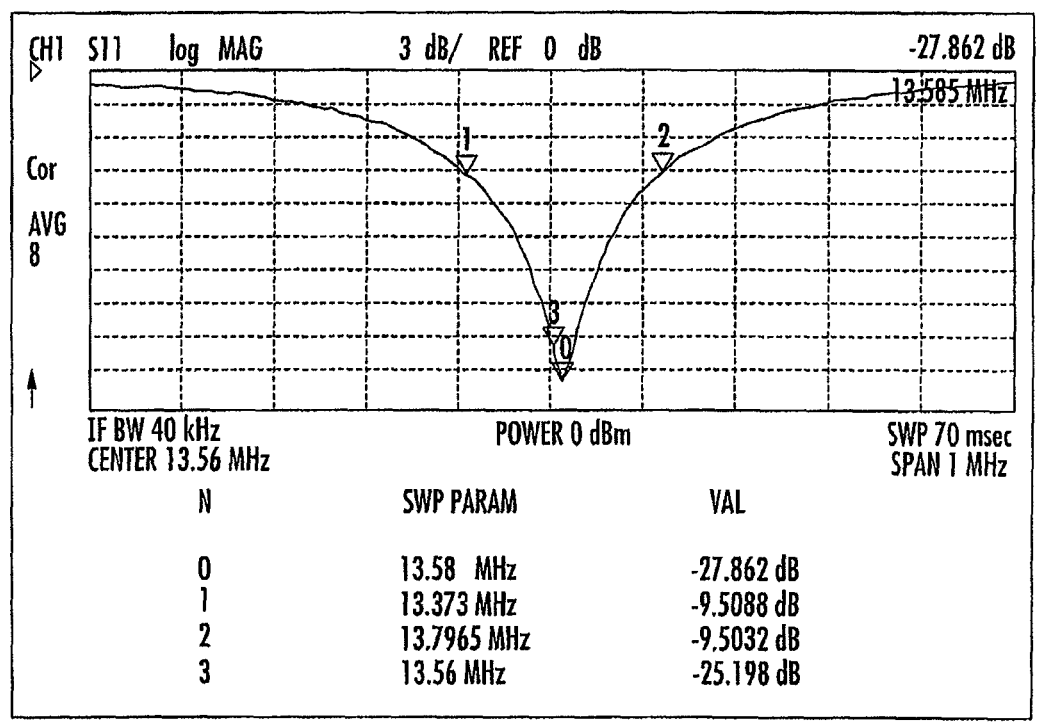
FIG. 15 illustrates a S11 parameter of a tuned HF identification coupler according to an exemplary embodiment.
Figure 16:
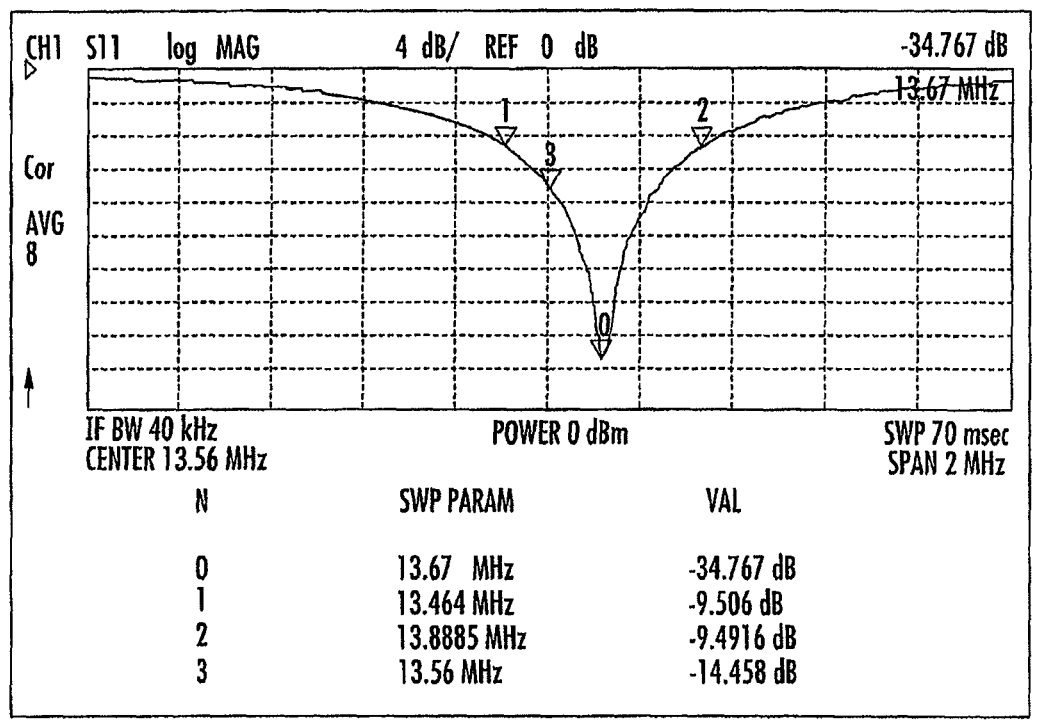
FIG. 16 illustrates the S11 parameter of FIG. 15 in the vicinity of 13.56 MHz in a substantially worst case.

As illustrated in FIG. 15, to achieve a maximum core offset positioning range the HF identification coupler may be tuned at 13.56±0.25 MHz and its impedance may be matched to 50 ohms. Optimum couple tuning and its impedance matching may be performed when an empty core, i.e., no media unit transponders are wound around the core, with the identification transponder 64 positioned on the spindle at approximately 0 mm distance from a reference point, as illustrated in FIG. 14a. In this embodiment, the coupler may provide a sufficient coupling with the identification transponder (at least 3 dB RF power margin) at any angular position within a specified (e.g., 9 mm) core offset positioning range and transponder placement tolerance (±1.5 mm) while maintaining impedance mismatch and return loss not exceeding −10 dB at 13.56 MHz for the S11 parameter in the worse case as illustrated in FIG. 16 (shown as −14.458 dB).

Figure 17:
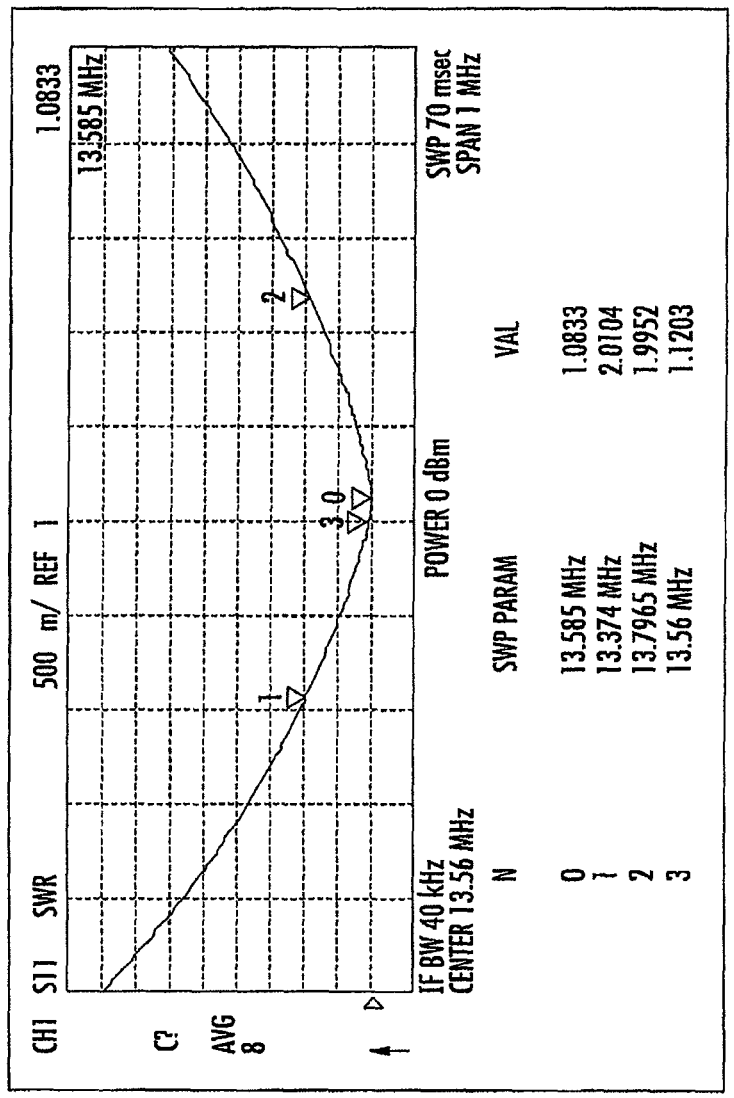
FIG. 17 illustrates a coupler bandwidth at VSWR equals to two according to an exemplary embodiment.

In some embodiments, the coupler bandwidth (defined by VSWR=2) may be 300 KHz to 1 MHz. For example, in FIG. 17, the bandwidth is shown as 423 kHz. To facilitate a robust communication link in a coupler to transponder system, the RF power delivered to the transponder should exceed the minimum energizing level by a margin of at least 3 dB. The minimum RF power level for this embodiment may depend on angular and core offset positions. One technique, which may be used to determine power level margin above the minimum energizing level, is based on the use of an external RF power attenuator. The device is inserted between the identification coupler and a HF transceiver. The value of the inserted RF power attenuation is varied to determine the successful operating range in relative power (dB). The device may connect a HF reader and a coupler. A suppression of maximum available RF power from the transceiver allows for an estimation in relative power in dB at which the identification starts and stops working, i.e., communicating.

As discussed above, the identification transponder may store or otherwise provide data or information regarding intended or optimal print and encode format settings. In addition to or rather than retrieving such information from the identification transponder, the printer-encoder may be configured to recognize print and encode format settings or other user preferences through a transponder attached to or otherwise carried with a particular user. For example, the transponder may be embedded in the clothing, jewelry, or another item carried or worn by the user or somewhere in the user's body. According to this embodiment, the printer-encoder may include an antennae configured to recognize the transponder that is closest to the printer-encoder and a transponder reader of the printer-encoder may identify and notify the printer-encoder through the transponder in the person's clothing or body to tailor the printer settings to the preferences associated with the transponder.

Embodiments described above include a printer-encoder having at least one transceiver and one or more couplers for establishing a mutual coupling between the at least one transceiver and one or more transponders associated with consumables of the printer-encoder, such as a first identification transponder associated with the media roll, a second identification transponder associated with the printer ribbon supply roll, and the media unit transponders. As disclosed above, a transceiver of the printer-encoder may be in communication with one or more of the couplers or a transceiver may be in communication with a coupler. For example, the printer-encoder may equal number of transceivers to couplers.

In order to minimize inadvertent communication or other interference between the different couplers and transponders, the couplers and transponders may be positioned to have offsetting or different orientation to one another as discussed above. Moreover, in addition to or instead of the offsets or different orientation, the printer-encoder may have anti-collision software operable through a controller element and/or RF shielding components configured to reduce interference between the different couplers and transponder. Also, as discussed above, one or more of the transceivers, couplers, and transponders may be configured to operate within different frequency bands or sub-bands. And as another example, one or more of the transceivers, couplers, and transponders may be configured to operate within different protocols, such as ISO 15693, ISO 14443, or other RF protocols.

Many modifications and other embodiments of the invention set forth herein will come to mind to one skilled in the art to which this invention pertains having the benefit of the teachings presented in the foregoing descriptions and the associated drawings. Therefore, it is to be understood that the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A media roll comprising:
a core;
a plurality of media units wound about the core, wherein one or more of the plurality of media units include one or more media unit transponders;
an identification transponder attached to the core and having retrievable information pertaining to the plurality of media units, wherein:
the retrievable information includes parameters for configuring an encoding operation of the one or more media unit transponders; and
the parameters differ from that which is stored on the one or more media unit transponders; and
a RF field insulator positioned between the identification transponder and the plurality of media units, wherein the RF field insulator is configured to electromagnetically isolate the identification transponder from the plurality of media units making the identification transponder less susceptible to interference from the plurality of media units during retrieval of the retrievable information.

2. The media roll according to claim 1, wherein the identification transponder being at least partially embedded into the core.

3. The media roll according to claim 1, wherein the core extends from a first end to a second end and includes an outer surface and an inner surface and the identification transponder is attached to the outer surface.

4. The media roll according to claim 3, wherein the RF field insulator being a ferrite patch that covers at least the identification transponder opposite the outer surface of the core.

5. The media roll according to claim 4, wherein the ferrite patch substantially covers the outer surface of the core.

6. The media roll according to claim 4 further comprising a metal foil extending around the core and the ferrite patch.

7. The media roll according to claim 1, wherein the one or more media unit transponders are configured to operate within a first frequency band and the identification transponder is configured to operate within a second frequency band that is different from the first frequency band.

8. The media roll according to claim 1, wherein the one or more media unit transponders are configured to operate with a first communication protocol and the identification transponder is configured to operate with a second communication protocol that is different from the first communication protocol.

9. The media roll according to claim 1, wherein the retrievable information includes a count of the plurality of media units left on the media roll.

10. The media roll according to claim 1, wherein the retrievable information includes a count of the plurality of media units that failed to process properly through an RFID system.

11. The media roll according to claim 1, wherein the retrievable information includes format information.

12. The media roll according to claim 1, wherein the parameters useful to encode the one or more media unit transponders includes encoding instructions for the one or more media unit transponders.

13. The media roll according to claim 1, wherein the retrievable information is stored on the identification transponder in Extensible Markup Language.

14. The media roll according to claim 1, wherein the retrievable information includes an Electronic Product Code.

15. The media roll according to claim 14, wherein the Electronic Product Code is configured to be written to the one or more media unit transponders.

16. The media roll according to claim 1, wherein the retrievable information includes information identifying a type of antenna included in the one or more media unit transponders.

17. The media roll according to claim 1, wherein the retrievable information includes information identifying an operational frequency of the one or more media unit transponders.

18. The media roll according to claim 1, wherein the retrievable information includes information identifying read/write power levels to be used when communicating with the one or more media unit transponders.

19. The media roll according to claim 1, wherein the retrievable information includes information identifying optimal media sensor parameters to be used when communicating with the one or more media unit transponders.

* * * * *